(12) United States Patent
Lee

(10) Patent No.: US 6,931,014 B2
(45) Date of Patent: Aug. 16, 2005

(54) METHOD FOR GENERATING AND TRANSMITTING A TRAIN PACKET IN AN ATM SWITCH SYSTEM

(75) Inventor: Jong Ick Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/321,463

(22) Filed: Dec. 18, 2002

(65) Prior Publication Data

US 2003/0112815 A1 Jun. 19, 2003

(30) Foreign Application Priority Data

Dec. 18, 2001 (KR) .......................... 2001-80453

(51) Int. Cl.$^7$ .......................... H04L 12/28; H04L 12/56
(52) U.S. Cl. ................. 370/395.42; 370/412; 370/428; 370/432
(58) Field of Search .......................... 370/412, 395.41, 370/395.2, 395.21, 395.4, 395.42, 395.43, 428, 390, 432, 429, 359.43

(56) References Cited

U.S. PATENT DOCUMENTS

| 6,266,338 | B1 | * | 7/2001 | Simon et al. ............... 370/412 |
| 6,285,675 | B1 | * | 9/2001 | Sakurai et al. .............. 370/391 |
| 6,349,097 | B1 | * | 2/2002 | Smith ......................... 370/390 |
| 6,477,169 | B1 | * | 11/2002 | Angle et al. ........... 370/395.42 |
| 6,597,660 | B1 | * | 7/2003 | Rueda et al. ............ 370/230.1 |
| 2002/0131412 | A1 | * | 9/2002 | Shah et al. .................. 370/390 |
| 2002/0145974 | A1 | * | 10/2002 | Saidi et al. .................. 370/230 |
| 2003/0007498 | A1 | * | 1/2003 | Angle et al. ................ 370/414 |

* cited by examiner

Primary Examiner—Ajit Patel
Assistant Examiner—Chirag Shah
(74) Attorney, Agent, or Firm—Fleshner & Kim, LLP

(57) ABSTRACT

Embodiments of the present invention relate to generating a bundle of data (e.g. a packet). The bundle of data may comprise cells from a first queue and a second queue. All of the cells in the first queue are each independent. At least two cells of the second queue are dependent.

34 Claims, 13 Drawing Sheets

METHOD FOR GENERATING AND
TRANSMITTING A TRAIN PACKET IN AN
ATM SWITCH SYSTEM

BACKGROUND OF THE INVENTION

1. Field of the Invention

The present invention generally relates to communications and/or electronics.

2. Background of the Related Art

Communications is a developing field of technology that affects many people in their everyday lives. Examples of communications are telephone systems, wireless cellular phone systems, the Internet, broadcast radio, broadcast televisions, and many other services. All of these exemplary communication systems transmit information (i.e. data) from one place to another. Normally, a plurality of devices are used to transmit information from one place to another. Examples of such devices are cell phones, cell phone radio towers, and wireline telephone equipment.

Unfortunately, many of the devices used for communication have a limited capacity to transmit information. For example, a copper wire (or fiber optic cable) has capacity to transmit only a given number of telephone conversations. However, it may be possible for a given copper wire (or fiber optic cable) to be capable of transmitting more telephone conversations if devices in a communication system operate more efficiently. Accordingly, there has been a long felt need for devices in a communication system to operate more efficiently to increase the capacity of the communications system.

SUMMARY OF THE INVENTION

An object of the invention is to at least alleviate limitations of related art. Embodiments of the present invention relate to generating a bundle of data (e.g. a packet). The bundle of data may comprise cells from a first queue and a second queue. All of the cells in the first queue are each independent. At least two cells of the second queue are dependent.

Some communications systems include a switch. A switch may be used to route data from one location to another. In a switch, it may be desirable to bundle data together which are going to the same location so that a switch can operate efficiently. Additionally, sometimes information is divided into small portions, so that a communication system can properly digest transmitted information. Accordingly, when information is divided up into small portions, that information (i.e. cells) may be dependent. Because dependent information may have the same destination, it can be switched together. By switching dependent information together, a switch may operate efficiently. However, sometimes not enough dependent information exists to utilize the entire capacity of a switch. Accordingly, in embodiments of the present invention, information that is independent from the dependent information is transmitted with the dependent information. In circumstances, independent information and dependent information have the same destination. Additionally, these embodiments are advantageous, as a capacity of a switch may be increased.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

DETAILED DESCRIPTION OF PREFERRED EMBODIMENTS

Large subscriber applications have been generated in response to development of the Internet. Capacities of switches have increased to support subscriber applications. Since switch ports have increased bandwidths and a unit switch may have a large capacity, hardware bottleneck effects (e.g. memory access time and/or switching processing time) may frustrate the effectiveness and/or efficiency of a switch.

In embodiments, a Sequential-to-Parallel Train Packet (SPTP) method may make switches more efficient and/or effective. A SPTP method may combine and switch a plurality of cells to decrease a switching processing frequency of a switch. An ATM switch system may use a SPTP method to employ both a sequential train packet technology (for combining and switching a plurality of cells to reduce switching processing frequency) and a bit-slicing technology (for improving switching data ratio).

Figure 1:
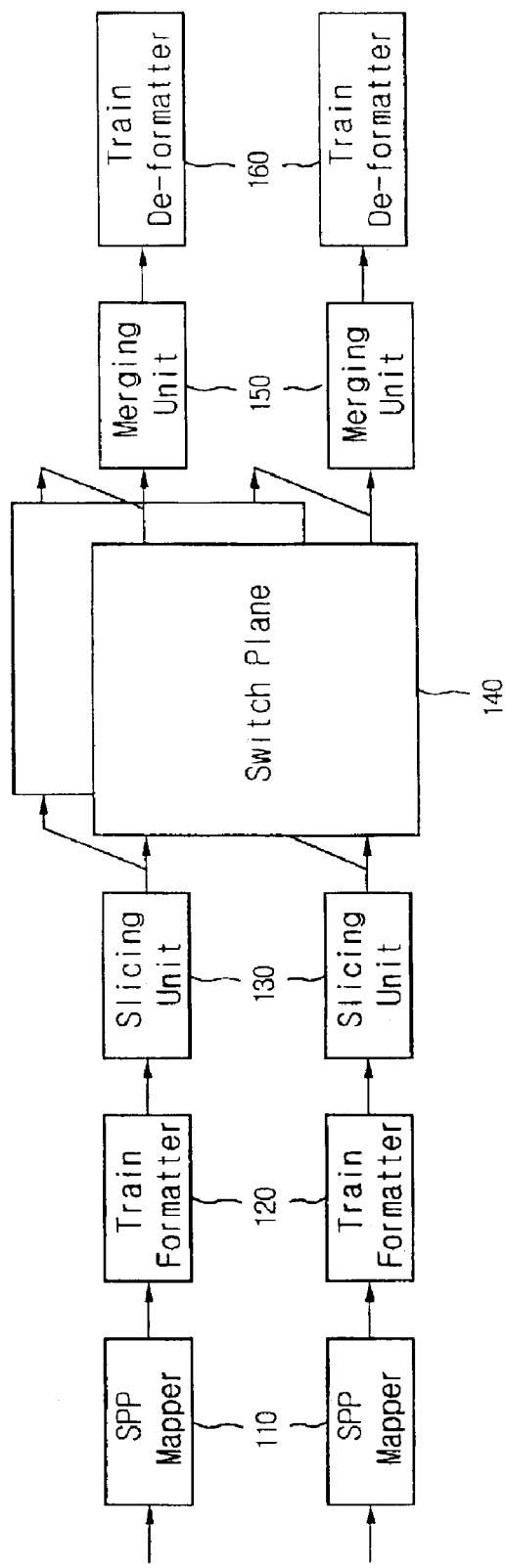
FIG. 1 is an exemplary structure diagram illustrating an ATM switch system using a SPTP method.

FIG. 1 is an exemplary structure diagram illustrating an ATM switch system using a SPTP method. Sequential-to-Parallel Packet (SPP) mappers 110 and train formatters 120 may be positioned respectively before N switch planes 140. Positioning of mappers 110 and formatters 120 may be for combining a plurality of input cells having the same switching plane routing tag to generate a single train packet. A train packet generated through SPP mappers 110 and train formatters 120 may be divided into N sub train packets through slicing units 130. N sub train packets may be inputted to switch planes 140. In embodiments, when it is presumed that a train packet is composed of M cells, each sub train packet may include M/N cells. N switch planes 140 may operate in a bit-slicing method that may be synchronously operated. N sub train packets having the same routing tag may be outputted to an identical switch plane destination port in the same phase. N sub train packets outputted to an identical switch plane destination port may be inputted to merging units 150 positioned after switch planes 140. Merging units 150 may combine sub train packets from N switch planes 140 to compose an original train packet. Train de-formatters 160 may divide a train packet into original cells and may output the cells to destination ports.

In embodiments, when unicast traffic or broadcast traffic is switched, unicast traffic queues and broadcast traffic queues may be managed by classifying egress de-formatters and switch plane destination ports. In a case that a unicast traffic queue or a broadcast traffic queue is selected according to scheduling, M cells may be read from a corresponding queue to generate a train packet and the train packet may be switched. When multicast traffic is switched, multicast queues may be managed according to a destination port property of switch planes 140. When a destination port of a multicast cell has a single switch plane destination port, the multicast cell may not need to be duplicated in switch planes 140. In embodiments, a multicast cell may be classified into grouped multicast traffic and may be queued in a queue managed according to each switch plane destination port. When a destination port of a multicast cell includes a plurality of switch plane destination ports, the multicast cell may need to be duplicated in switch planes 140. Multicast cells may be classified as general multicast traffic and may be stored in one queue.

When multicast cells are classified as grouped multicast traffic are queued in a queue managed according to switch plane destination ports, M multicast cells having the same switch plane destination port may be read from the queue to generate a train packet and then the train packet may be switched. Switch planes 140 may perform a switching function in a similar manner as unicast traffic or broadcast traffic. Merging units 150 and train de-formatters 160 may duplicate multicast cells and output them to destination ports.

When a multicast cell classified into general multicast traffic is queued in one queue, respective switch planes 140 may duplicate sub train packets. Merging units 150 and train de-formatters 160 may duplicate multicast cells and may output them to destination ports. In the case of grouped multicast traffic and/or general multicast traffic, when a number of cells queued in a queue is smaller than M, a train packet including M cells may be generated by padding a dummy cell. A padded cell may be deleted in merging units 150 and train de-formatters 160. When a number of cells queued in a queue is smaller than M, a train packet including M cells may be generated by padding idle cells as many as deficient cells, thereby consuming a switch bandwidth corresponding to the number of padded cells. Accordingly, when multicast traffic is small, a ratio of switch processes may be considerably reduced.

Figure 2:
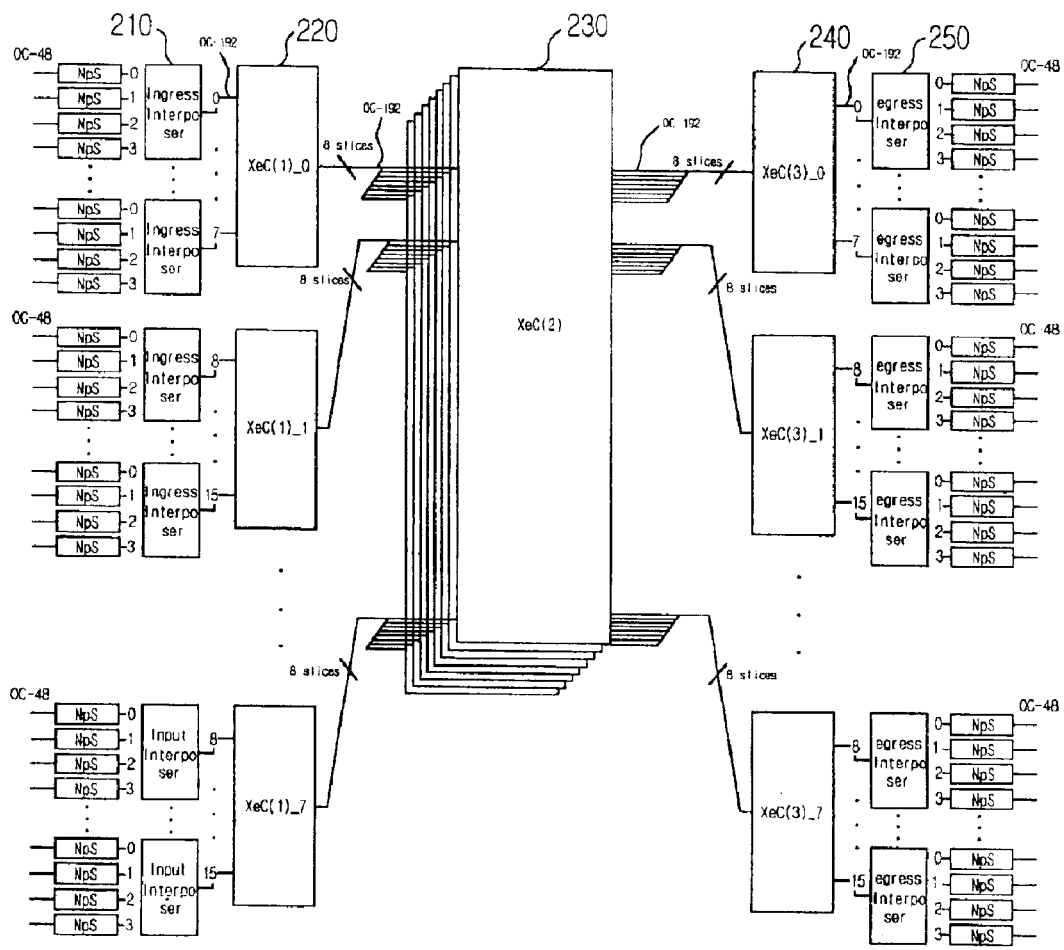
FIG. 2 is an exemplary structure diagram illustrating an ATM switch system using a SPTP method consisting of 5 stages.

FIG. 2 is an exemplary structure diagram illustrating an ATM switch system using a SPTP method consisting of 5 stages. Ingress interposers 210 (which may be stage 0 switches) may serve as SPP formatters and/or train formatters. Stage 1 switches (XeC(1)_*) 220 may serve as slicing units. Switch planes (XeC(2)_*) 230 (which may be stage 2 switches) may be operated as switch planes using a bit-slicing method. Stage 3 switches (XeC(3)_*) 240 may be operated as merging units. Egress interposers 250 (which may be stage 4 switches) may be operated as train de-formatters. The symbol '*' denotes a wild card character.

Ingress interposers 210 (which may be stage 0 switches to which a network processor NpS may have a maximum of four line cards connected) may combine a plurality of input cells having the same switch plane routing tag and/or may generate one train packet. A train packet may be divided into N sub train packets through stage 1 switches (XeC(1)_*) 220. Sub train packets (which may be divided by stage 1 switches 220) may be inputted to switch planes (XeC(2)_*) 230. Switch planes 230 (that receive sub train packets from stage 1 switches 220) may output N sub train packets having the same routing tag to an identical switch plane destination port at the same phase. Sub train packets output from switch planes 230 may be merged in stage 3 switches (XeC(3)_*) 240 and may generate an original train packet. Egress interposers 250 may divide a train packet into original cells. Egree interposers 250 may output cells to corresponding destination ports.

Cells inputted to an ATM switch system using a SPTP method consisting of 5 stages may be classified as unicast traffic, grouped multicast traffic, general multicast traffic, and broadcast traffic according to a number of destination ports and properties thereof in order to manage queues. Cells stored in a queue may be formatted into two-step train packets (e.g. L0 Train packet and L1 Train packet) and the train packets may be switched.

Ingress interposers 210 may store cells in one of unicast queues (e.g. 64 queues; 64 egress interposers), grouped multicast queues (e.g. 8 queues; 8 switch plane destination ports), general multicast queue (e.g. 1 queue), and a broadcast queue (e.g. 1 queue) according to destination port properties of the cells. Ingress interposers 210 may generate a L0 train packet by using cells stored in a queue according to an L0 train packet generation algorithm. A L0 train packet may include two cells.

Figure 3:
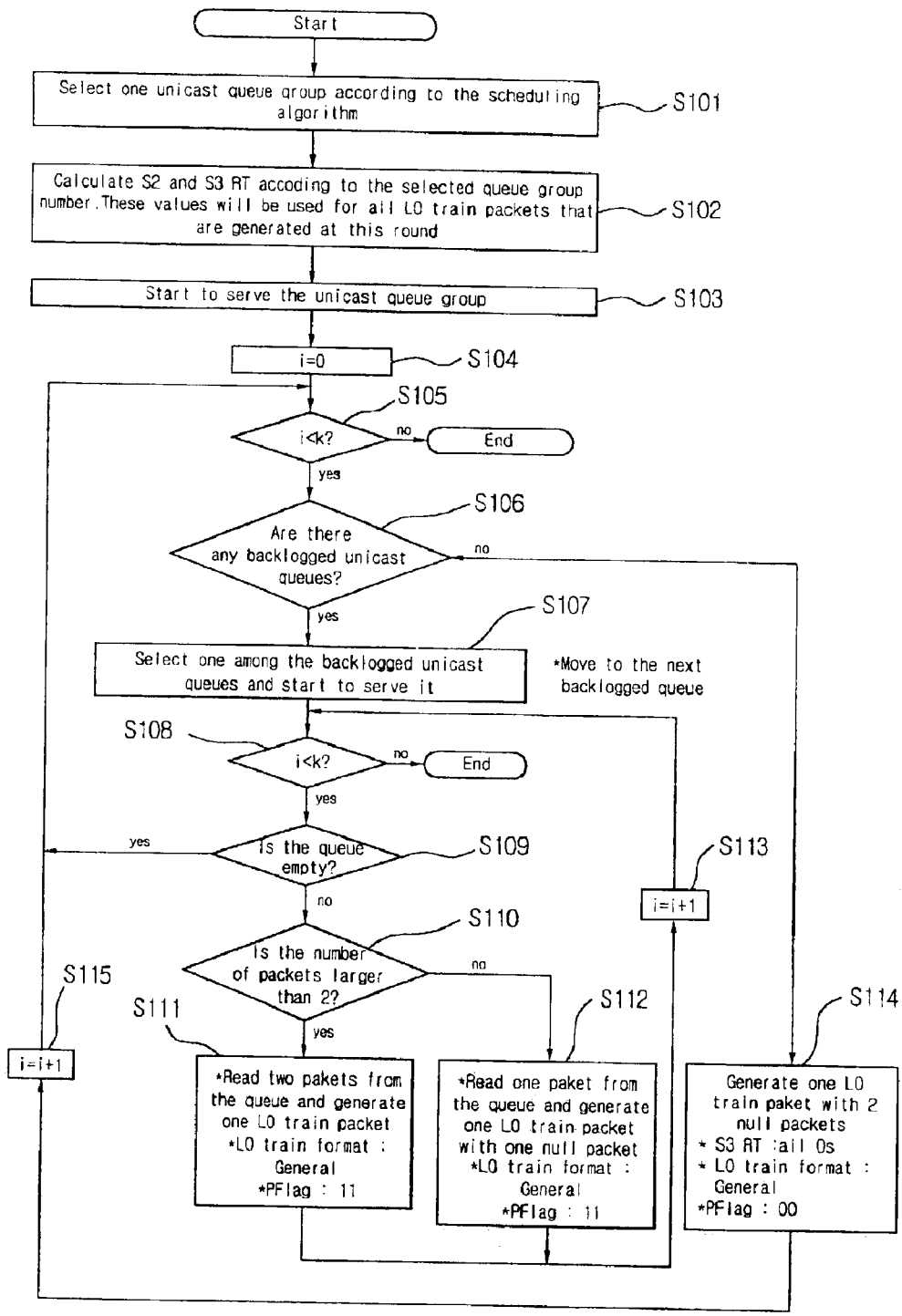
FIGS. 3 through 5 are exemplary flowcharts illustrating a method for generating L0 and L1 train packets.
Figure 4:
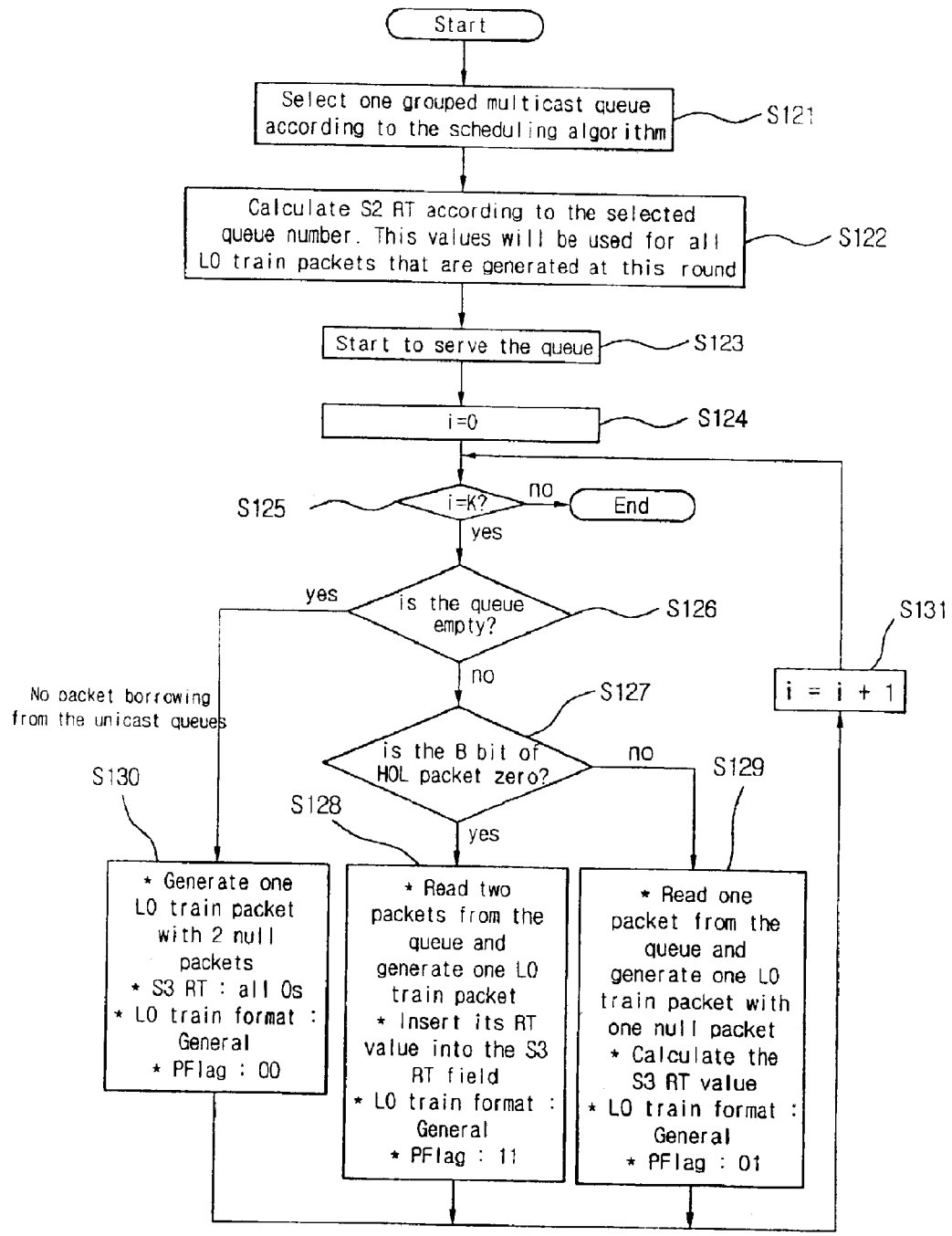
Figure 5:
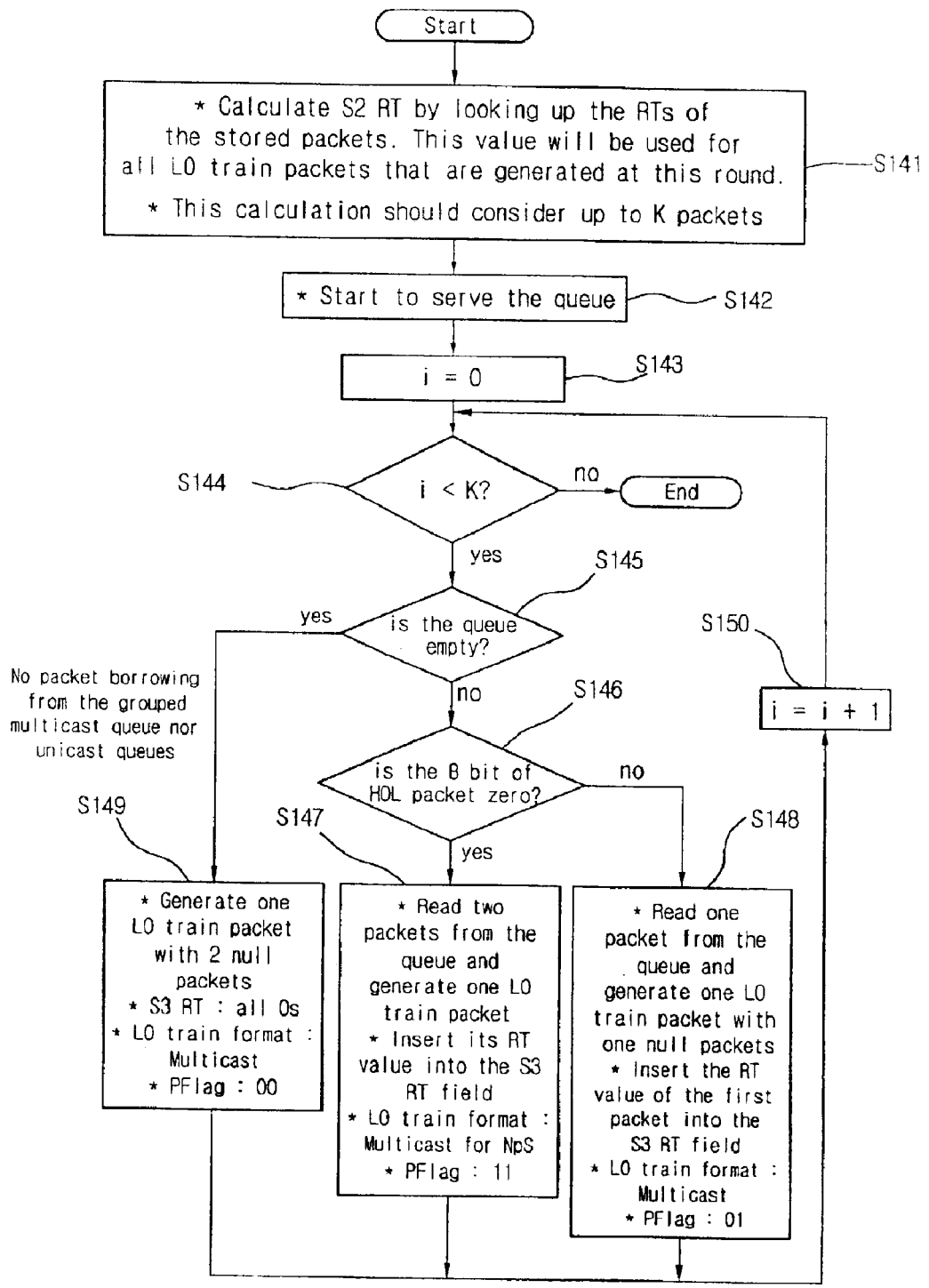

FIG. 3 is an exemplary flowchart illustrating a method for generating L0 and L1 train packets as unicast traffic. FIG. 4 is an exemplary flowchart illustrating a method for generating L0 and L1 train packets as grouped multicast traffic. FIG. 5 is an exemplary flowchart illustrating a method for generating L0 and L1 train packets as general multicast traffic.

As illustrated in exemplary FIG. 3, whether K L0 train packets (K may be a number of switch planes, for example a number of L0 train packets included in a L1 train packet) are all generated, may be confirmed by selecting one unicast group in a round robin method among the unicast groups grouped by destination ports of switch planes (S101–S105). When K L0 train packets are generated from a selected unicast group, generation of L0 and L1 train packets may be finished. A L1 train packet may be generated by using K L0 train packets. As a confirmation result of S105, when K L0 train packets are not all generated, it may be confirmed whether a backlogged unicast queue exists in a selected unicast group (S106). If a backlogged unicast queue remains, whether a number of generated L0 train packets reaches to K is confirmed and when a number of L0 train packets is not K, a state of the unicast queue may be examined (S107–S109). If a queue is not empty, if a number of stored cells is greater than two, one L0 train packet may be generated by using two cells (S11). When a number of stored cells is not greater than two (namely, one cell is stored), one L0 train packet including two cells may be generated by reading one packet from a queue and/or using a dummy cell (S112). In a case that a selected queue is empty, a L0 train packet may be generated by using two dummy cells (S114). It may be confirmed whether the number of L0 train packets reaches K. A procedure may be repeated until K L0 train packets are generated.

Whether K L0 train packets (K may be a number of switch planes, for example a number of L0 train packets included in a L1 train packet) are all generated, may be confirmed by selecting one grouped multicast queue in a round robin method (S121–S125). If K L0 train packets are generated from a selected grouped multicast queue, generation of L0 and L1 train packets may be finished. When K L0 train packets are not all generated, a state of a grouped multicast queue may be examined (S126). When a selected queue is not empty, if B bit information (e.g. a bit notifying that a succeeding cell of a queue belongs to the same virtual connection) of a header of a cell existing in a head of line (HOL) of the queue is '0', it may be implied that a succeeding cell is generated from the same virtual connection as the HOL cell. Accordingly, two cells may be read from a queue to generate one L0 train packet (S127 and S128). In a case that a B bit is '1', it may be implied that a succeeding cell of a queue is generated from a virtual connection different from that of a HOL cell, and thus only the HOL cell may be read from the queue. Therefore, a L0 train packet having two cells may be generated by using a HOL cell and a dummy cell. When a grouped multicast queue is empty, a L0 train packet may be generated by using two dummy cells (S130). A procedure may be repeated until K L0 train packets are generated (S131).

Referring to FIG. 5, whether K L0 train packets (K is a number of switch planes, e.g. a number of L0 train packets included in a L1 train packet) are all generated may be confirmed by looking up a single general multicast queue (S141–S144). When K L0 train packets are generated from a general multicast queue, generation of L0 and L1 train packets may be finished. When K L0 train packets are not all generated, a state of a general multicast queue may be examined (S145). When a selected queue is not empty, if B bit information of a header of a cell existing in a head of line (HOL) of a queue is '0', it may imply that the succeeding cell is generated from the same virtual connection as a HOL cell (S146). Accordingly, two cells may be read from a queue to generate one L0 train packet (S147). In a case that a B bit is '1', it may be implied that a succeeding cell of a queue is generated from a virtual connection different from that of a HOL cell, and only the HOL cell may be read from the queue (S148). A L0 train packet having two cells may be generated by using a HOL cell and a dummy cell. When a general multicast queue is empty, a L0 train packet may be generated by using two dummy cells (S149). A procedure may be repeated until K L0 train packets are generated.

In order to generate a L1 train packet for general multicast traffic, when a stage 2 routing tag (S2RT) of stage 2 switches (switch planes) is determined, the S2RT of K L0 train packets may be logically OR gated to generate a new S2RT. Generated S2RT may be renewed and/or stored in S2RT fields of headers of K L0 train packets to adjust L1 train packet synchronization of switch planes. Stage 1 switches (XeC(1)_*) 220 receiving a L1 train packet from ingress interposers 210 may slice a L1 train packet into K sub train packets (K may be a number of switch planes, e.g. a number of L0 train packets included in a L1 train packet; one sub train packet may include one L0 train packet). Stage 1 switches (XeC(1)_*) 220 may transmit K sub train packets to switch planes (XeC(2)_*) 230 in parallel. Switch planes (XeC(2)_*) 230 may transmit sub train packets to stage 3 switches (XeC(3)_*) 240 at the same phase. Stage 3 switches (XeC(3)_*) 240 may generate one original L1 train packet by using the K sub train packets. Stage 3 switches (XeC(3)_*) 240 may switch L0 train packets to egress interposers 250 of L0 train packets. Egress interposers 250 may transmit cells to line cards connected to destination ports of cells of L0 train packets.

Figure 6:
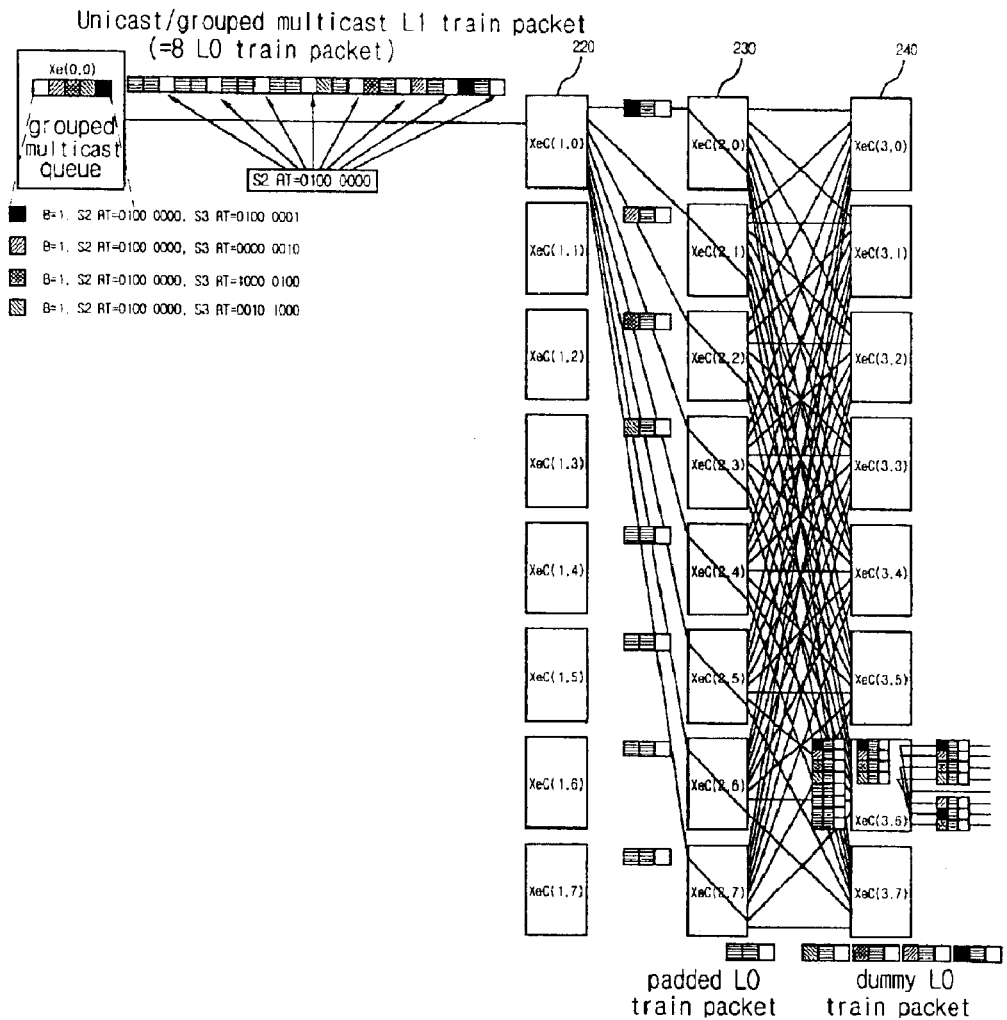
FIG. 6 is an exemplary diagram illustrating a routing process in a switch for grouped multicast traffic.

FIG. 6 illustrates an example of switching grouped multicast traffic in an ATM switch system using a SPTP method including 5 stages. In the example, L0 train packets including effective user cells (not dummy cells) among K L0 train packets (8 switch planes are used in FIG. 6, and thus k=8) may be generated from grouped multicast traffic. B bits of L0 train packet headers may all be set up as '1'. Accordingly, four L0 train packets including user cells may have one effective cell. Four cells included in a L1 train packet may be composed of dummy L0 train packets. Accordingly, only four cells may be switched in an ATM switch system which can switch a maximum of 16 cells (8 L0 train packets×2 cells (or L0 train packets)). L0 train packets may be duplicated from stage 3 switches (XeC(3)_*) 240 to egress interposers 250. In L0 and L1 train packets for grouped multicast traffic, a S2RT used in switch planes may be identical. However, a stage 3 routing tag (S3RT) used in stage 3 switches may be different.

Figure 7:
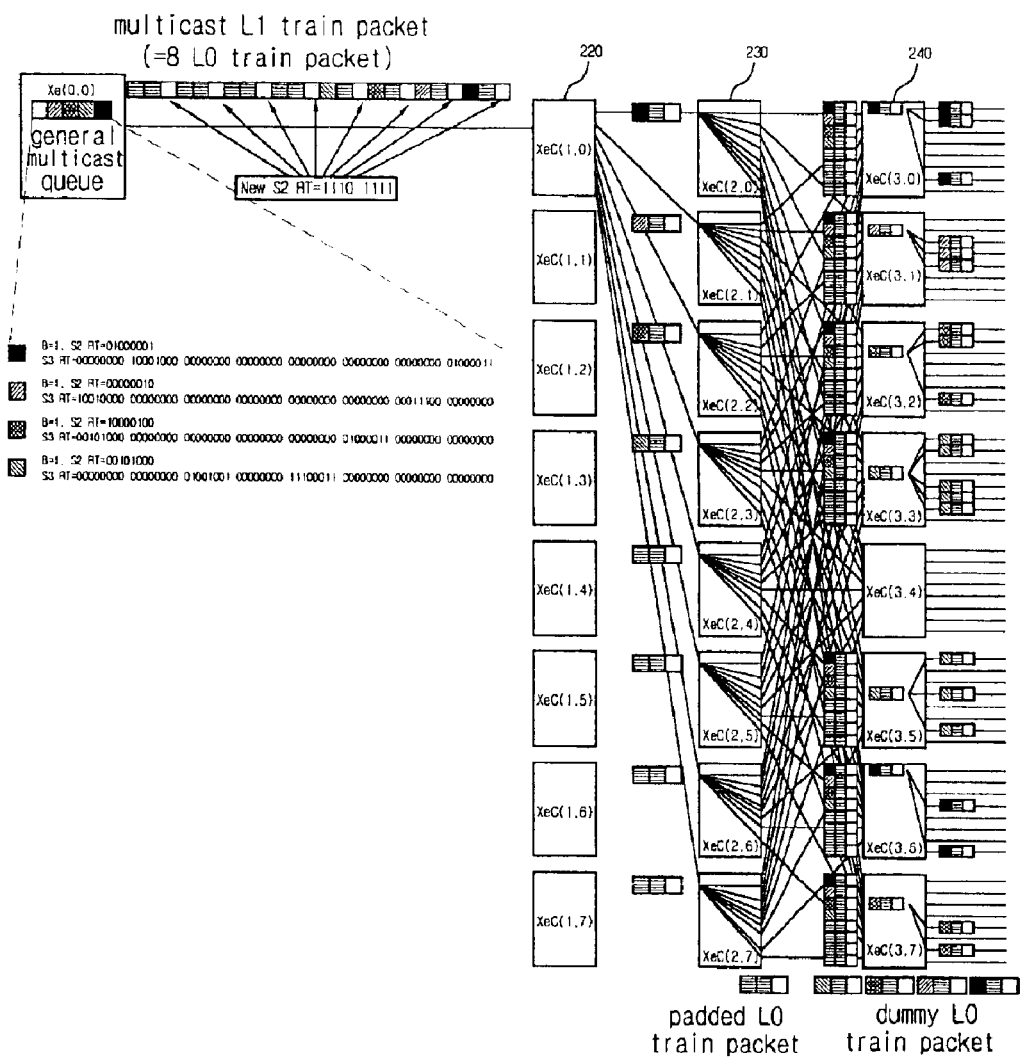
FIG. 7 is an exemplary diagram illustrating a routing process in a switch for general multicast traffic.

FIG. 7 illustrates an example of switching general multicast traffic. In this example, four L0 train packets including effective user cells (not dummy cells) are among K L0 train packets (8 switch planes are used in FIG. 6, and thus k=8) generated from general multicast traffic. B bits of L0 train packet headers may be all set up as '1'. Accordingly, four L0 train packets including user cells may have one effective cell. The other four cells that include a L1 train packet may include dummy L0 train packets. Four cells may be switched in an ATM switch system which can switch a maximum of 16 cells (8 L0 train packets×2 cells (or L0 train packets)). L0 train packets may be duplicated from stage 3 switches (XeC(3)_*) 240 to egress interposers 250. In L0 and L1 train packets for general multicast traffic, a S2RT used in switch planes may be identical (newly-generated S2RT by ORing S2RT of the K L0 train packets). However S3RT that may be used in stage 3 switches may be different.

L0 train packet may be generated by using two cells due to switching efficiency in an ATM switch system using a SPTP method consisting of 5 stages. In multicast traffic (grouped multicast traffic or general multicast traffic), when cells do not belong to the same connection ID, one cell may be read from a queue and a dummy cell may be used to generate a L0 train packet. When it is impossible to generate K L0 train packets (K is a number of switch planes), a L1 train packet may be generated by padding a dummy L0 train packet.

There may be a low probability of consecutively inputting multicast cells having the same connection ID to a switch. Sufficient multicast cells (K) may not be stored in whole multicast queues in every L1 train packet generation cycle. It may be difficult to avoid using dummy cells or dummy L0 train packets. Dummy cells may often be used to generate a L0 train packet or L1 train packet in an ATM switch system using a SPTP method consisting of 5 stages, to reduce a ratio of switch processes.

Embodiments of the present invention relate to an ATM switch system using a method for generating a train packet similar to an exemplary structure of an ATM switch system using a SPTP method consisting of 5 stages illustrated in FIG. 2. A L0 train packet may be composed of a maximum of two effective cells. The two cells may have the same routing tag S2RT and S3RT. A L0 train packet may be composed of two dummy cells, one dummy cell and one user cell, or two user cells. When a L0 train packet includes two dummy cells or one dummy cell, a unicast queue may be used to generate an effective L0 train packet.

Figure 8A:
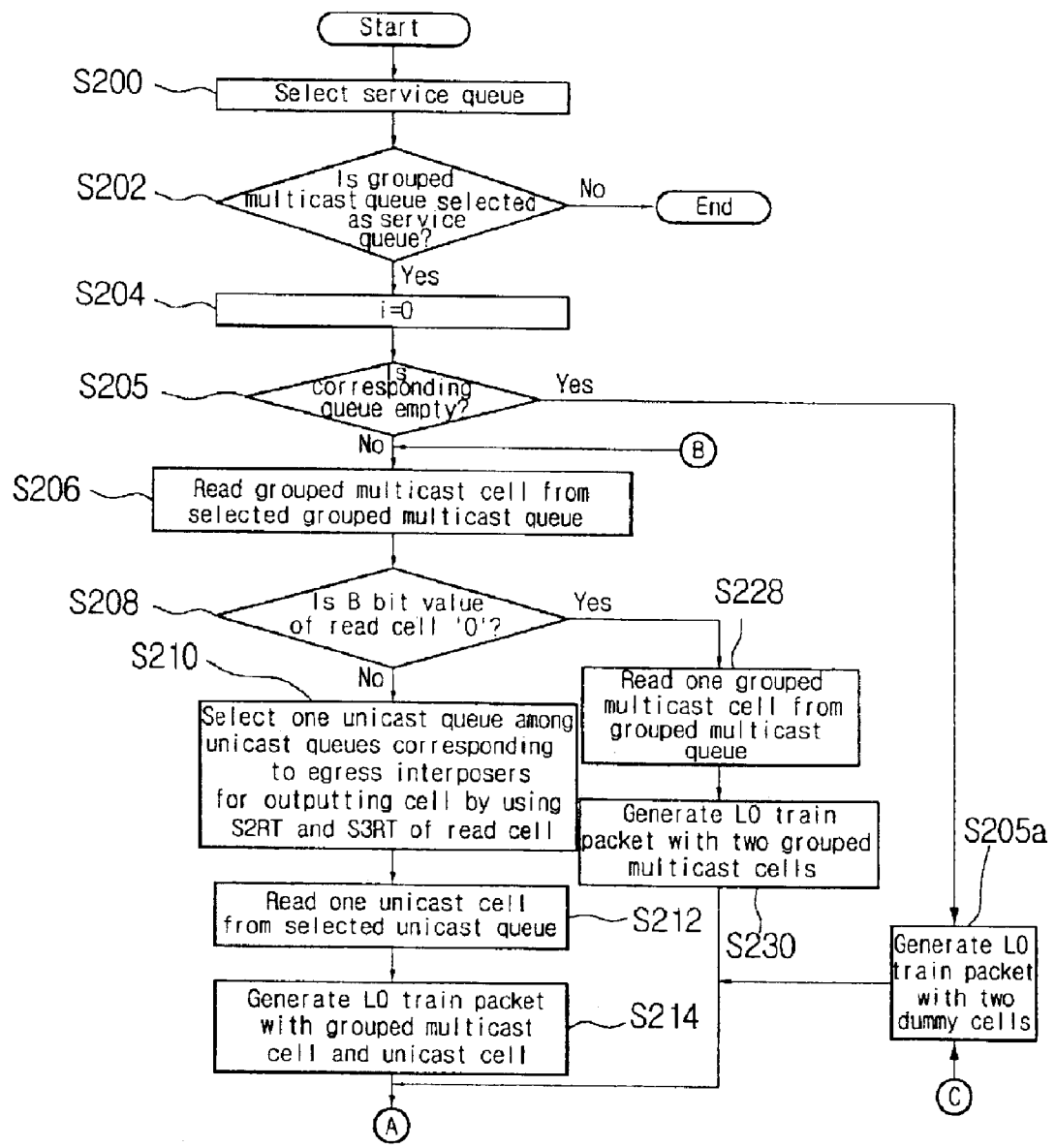
FIGS. 8(8a,8b) and 9(9a,9b) are exemplary flowcharts illustrating a method for generating a train packet in an ATM switch system.
Figure 8B:
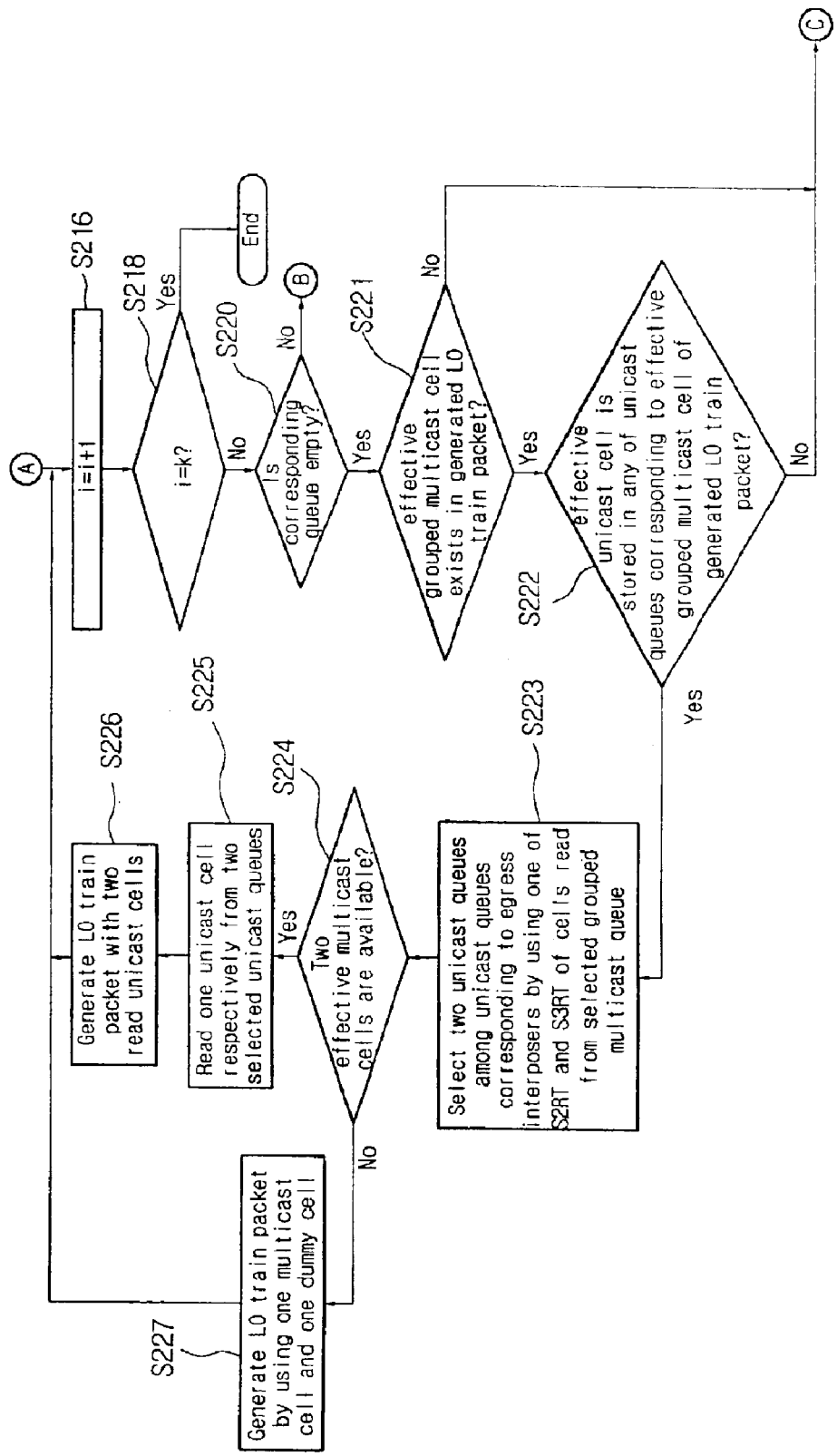
Figure 9A:
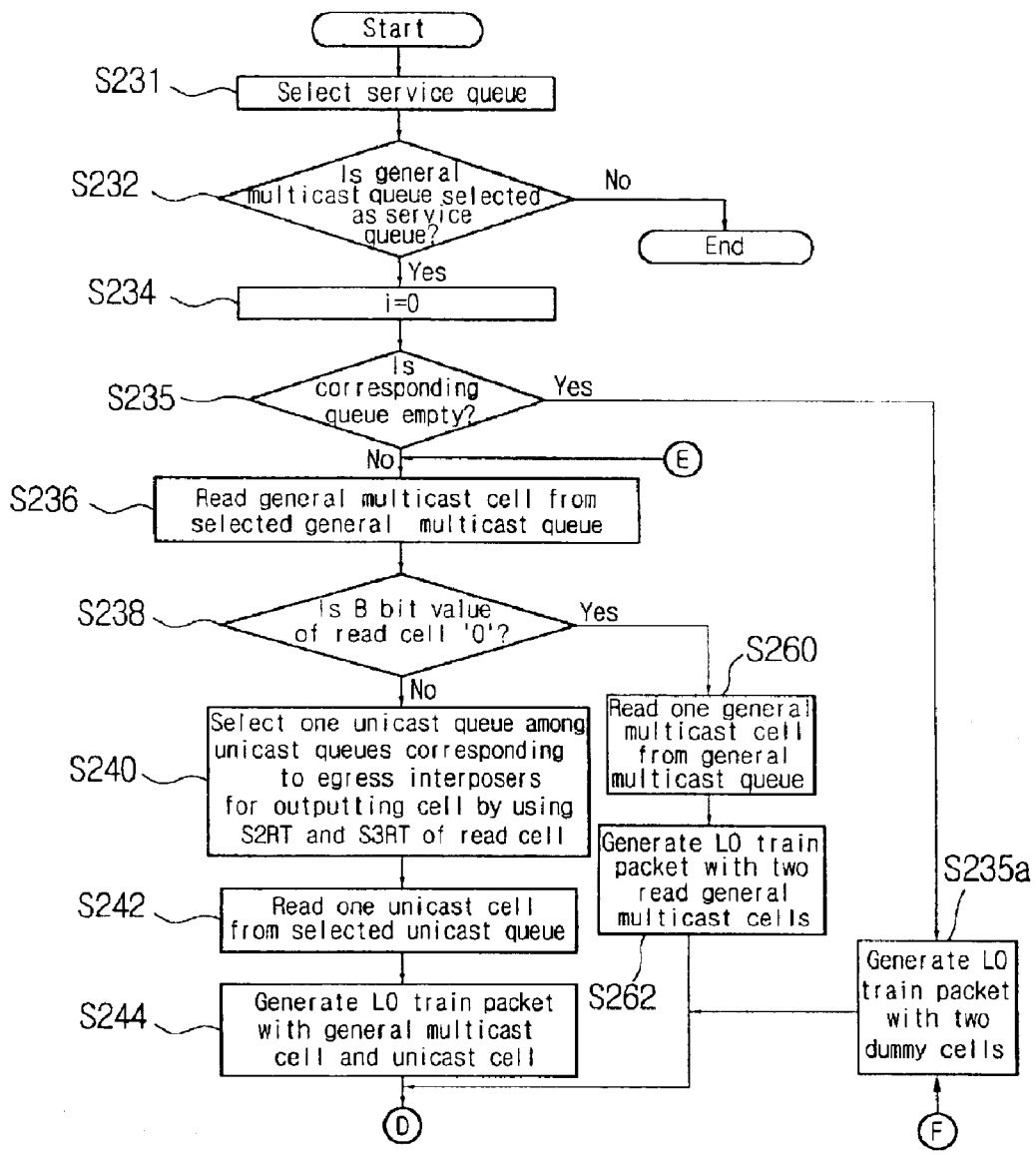
Figure 9B:
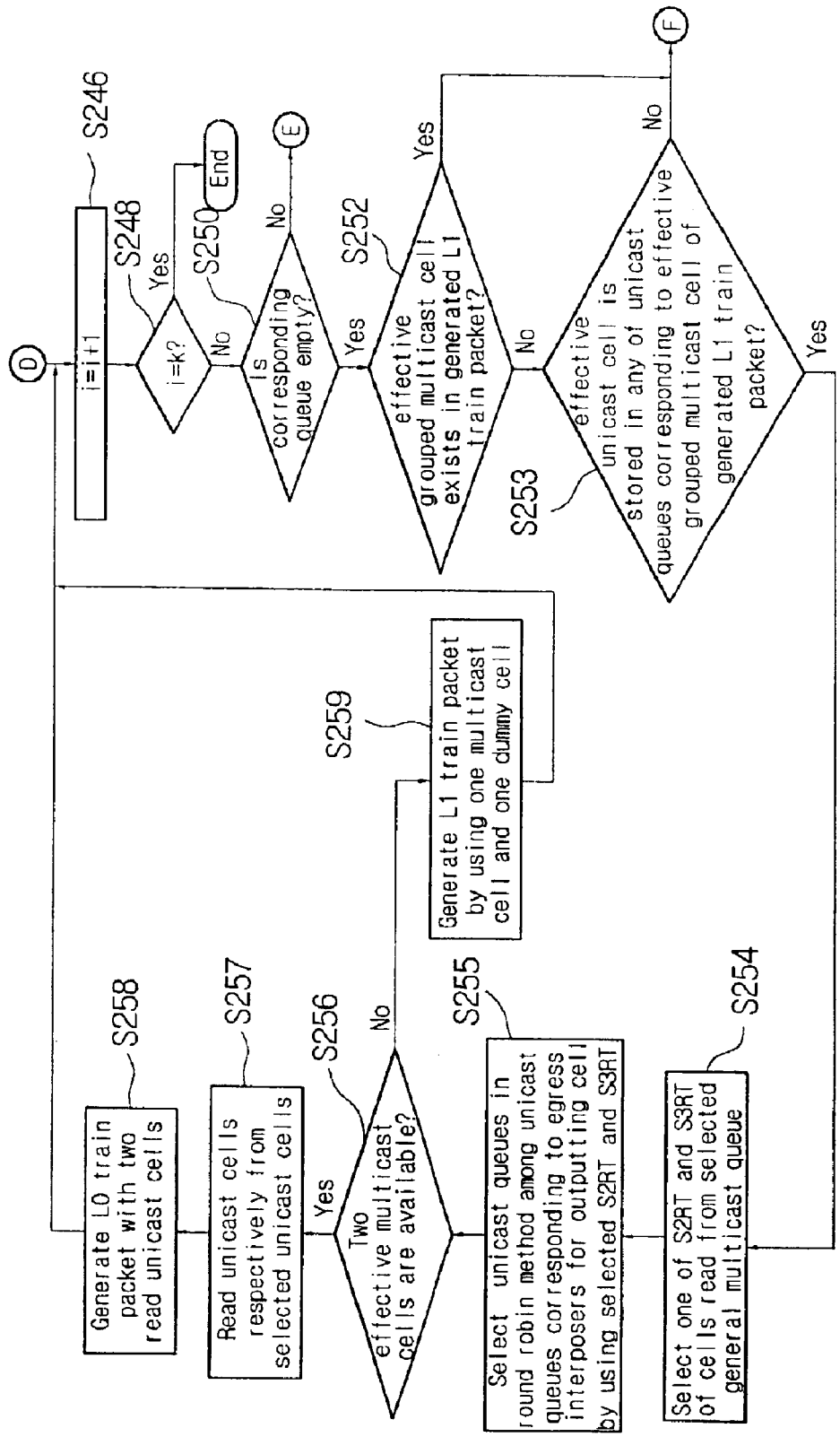

FIG. 8 is an exemplary flowchart illustrating a method for generating a train packet when a grouped multicast queue is selected as a service queue. FIG. 9 is an exemplary flowchart illustrating a method for generating a train packet when a general multicast queue is selected as a service queue.

Referring to FIGS. 8(8a,8b), a specific queue may be selected as a service queue among a few kinds of queues (unicast/broadcast traffic, grouped multicast traffic, general multicast traffic, and broadcast traffic) classified according to a number of destination ports of cells inputted through a primary scheduler and properties thereof (S200). Packets (or cells) may be read from queues to generate L0/L1 train packets. A procedure may include round robin scheduling for respective queues. Each queue may be classified into queue groups according to priority. A queue group may be assigned a priority level before selecting services for each queue.

It may be confirmed whether a selected service queue is a grouped multicast queue (S202). When a grouped multicast queue is selected as a service queue, a parameter (i) notifying a current number of L0 train packets is set as '0' (S204). Whether a corresponding queue is empty may be confirmed (S205). When a corresponding queue is not empty, a new head of line (HOL) multicast cell may be read from a grouped multicast queue (S206).

It may be confirmed whether a B bit value of a grouped multicast cell read in S206 is set up as '0' (S208). When a B bit value is '0', it may be implied that the read multicast cell and a succeeding cell can be regarded to pertain to the same connection and may have the same routing tag (e.g. same S2RT, S3RT and S4RT). When a B bit value is '1', it may be implied that two cells have different S3RT and S4RT.

As a confirmation result of S208, when a B bit value of a grouped multicast cell read in S206 is set as '1' (e.g. a succeeding cell has a different S3RT and S4RT), two cells cannot compose a L0 train packet. A fan-out port through which a grouped multicast cell is outputted may be detected by using S2RT and S3RT of a HOL cell read from a grouped multicast queue selected in S200. One unicast queue may be selected in a round robin method among corresponding unicast queues. One unicast cell may be read from a selected unicast queue (S210 and S212).

Figure 10:
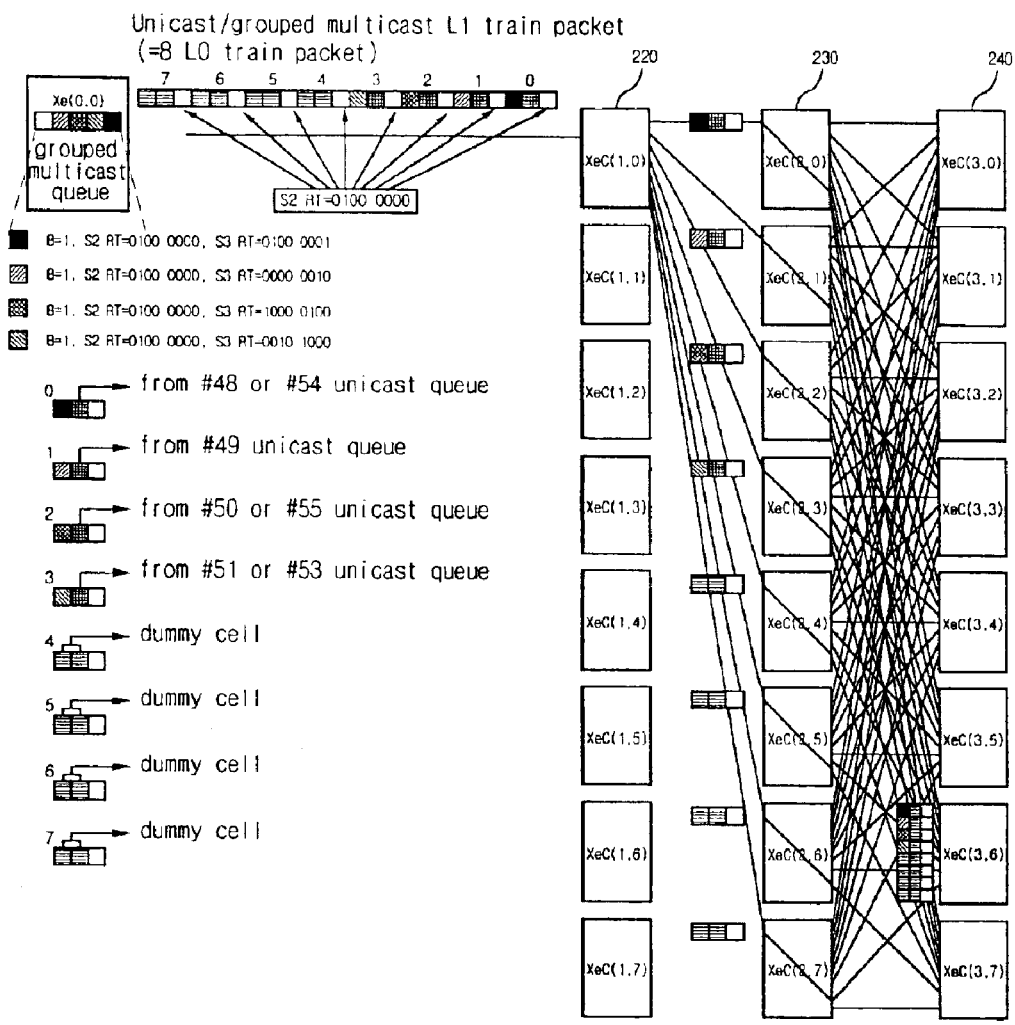
FIG. 10 is an exemplary diagram illustrating a routing process in a switch for grouped multicast traffic.

As illustrated in FIG. 10, when a S2RT of a grouped multicast cell read from a grouped multicast queue is outputted to 01000000(Xe(3,6)) and a S3RT is outputted to XeI(4,0) and XeI(4,6) among eight XeI connected to 01000001(Xe(3,6)), unicast queues corresponding to egress interposers for outputting grouped multicast cell are #48 and #54. One unicast queue may be selected therefrom in a round robin method. One unicast cell may be read from a unicast queue. An effective L0 train packet may be generated with a grouped multicast cell read in S206. Unicast cell may be read in S212 (S214). Parameter (i) notifying the number of L0 train packets may be increased by one (S216).

Identical to a L0 train packet generated in S214, when a L0 train packet includes an unicast cell, a S2RT, S3RT, and S4RT may be stored in a switch routing field stored in a header of L0 train packet. S2RT and S3RT may be designated to be identical to S2RT and S3RT of a grouped multicast cell composing a L0 train packet. S4RT may be designated by using a cell routing tag stored in a cell header of a unicast cell included in a L0 train packet. It may be judged whether parameter (i) increased in S216 is identical to a number (K) of switch planes (S218). As a result of S218, when parameter (i) is not identical to a number (K) of switch planes, whether a grouped multicast queue selected in S200 is empty may be confirmed (S220). As a confirmation result of S220, when a grouped multicast queue is not empty, a routine may go back to S206. A procedure of reading a new HOL multicast cell from a grouped multicast queue selected in S200 and generating a train packet by using a unicast cell from a unicast queue may be repeated until the grouped multicast cell does not exist. It may be confirmed whether the number of L0 train packets is identical to the number of switch planes.

When a grouped multicast queue is exhausted, a corresponding multicast queue may be empty. Accordingly, fewer cells than switch planes may be stored by a selected multicast queue. As a judgment result of S220, when a selected grouped multicast queue is empty, it may be confirmed whether an effective grouped multicast cell exists in a generated L0 train packet. When a grouped multicast cell does not exist, a L0 train packet (including two dummy cells) may be generated (S205a). As a confirmation result of S205, when a corresponding queue is empty, a L0 train packet including two dummy cells may be generated. When generation of a L0 train packet including two dummy cells is finished, a routine may go to S216 to generate a train packet for a succeeding queue. When an effective grouped multicast cell exists in a L0 train packet, it may be confirmed whether an effective unicast cell is stored in any unicast queues corresponding to the effective grouped multicast cell included in the L0 train packet (S222). As a confirmation result of S222, when an effective unicast cell is not stored, a routine may go to S205a. As a confirmation result of S222, when an effective unicast cell is stored in any unicast queues corresponding to an effective grouped multicast cell included in a L0 train packet, the unicast queues are selected in a round robin method from a plurality of unicast queues. A plurality of unicast queues may correspond to final egress interposers 250 for outputting grouped multicast cells with reference to S2RT and S3RT of the grouped multicast cells read from a selected grouped multicast queue (S223). It may be judged whether two effective multicast cells are available among selected unicast queues (S224).

As a judgment result of S223, a L0 train packet may be generated by using one unicast cell and one dummy cell. A routine may continue to S216 (S227). As a judgment result of S224, unicast cells may be read from two selected unicast queues (S225). A L0 train packet may be generated by using two unicast cells (S226). A routine may go to S216 after S226 and S227 to increase a parameter (i) for notifying number of L0 train packets by one.

Exemplary FIG. 10 illustrates that when S2RT of multicast cells is read from a grouped multicast queue is 01000000 and S3RT is 01000001 (S3RT of first cell), 00000010 (S3RT of second cell), 10000100 (S3RT of third cell) and 00101000 (S3RT of fourth cell), if a L0 train packet composed merely of unicast cells is set up to follow a last cell (fourth cell), unicast queues corresponding to egress interposers for outputting a fourth grouped multicast cell are #50 and #52. Accordingly, two unicast queues may be selected in the round robin method. One unicast cell may be read respectively from two unicast queues. A L0 train packet may be generated with two effective cells read in S224 (S226). A routine may go back to S216 to increase parameter (i) notifying the number of L0 train packets by one.

Figure 11:
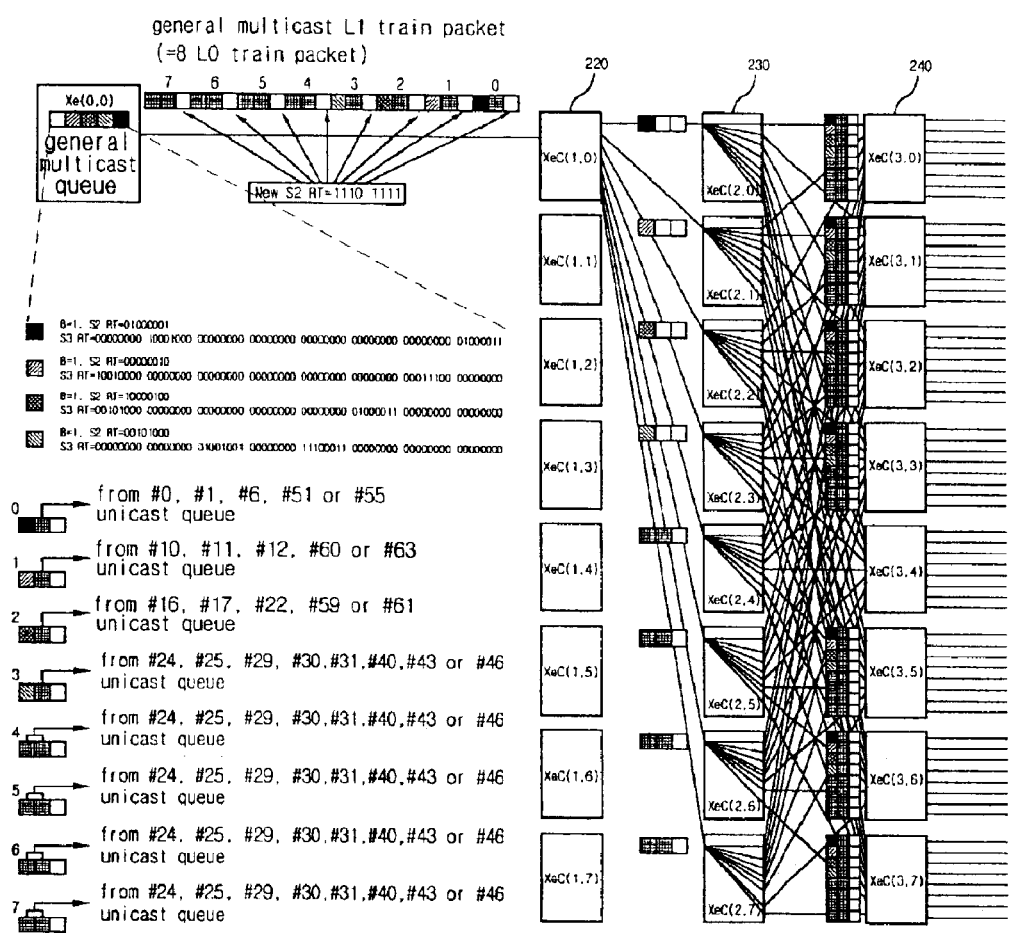
FIG. 11 is an exemplary diagram illustrating a routing process in a switch for general multicast traffic.

When cells do not exist in eight unicast queues belonging to the same group as a grouped multicast queue selected in S200, a L0 train packet may be generated by using two dummy cells. Parameter (i) notifying a number of L0 train packets may be increased by one. As illustrated in FIG. 11, for instance, when a unicast cell composing a L0 train packet does not exist in #48, #49, #50, #51, #53, #54 and #55 unicast queues, four L0 train packets may be generated by using two dummy cells. Accordingly, eight L0 train packets may be generated. A L1 train packet may be generated by employing a multicast cell, a unicast cell, and a dummy cell.

When a B bit value of a grouped multicast cell read in S208 is set up as '0', (e.g. a succeeding cell has the same S3RT and S4RT), one grouped multicast cell may then be read from a selected grouped multicast queue (S228). A L0 train packet may be generated by using a grouped multicast cell read in S206. A grouped multicast cell may be read in S228 (S230). A routine may then go back to S216 to increase a parameter (i), notifying the number of L0 train packets by one. Grouped multicast traffic may include K effective L0 train packets in ingress interposers through a procedure exemplified in steps S202 to S230. K L0 train packets may be included in a L1 train packet.

A switching operation of a L1 train packet is exemplified in FIG. 10. A L1 train packet generated in ingress interposers may be inputted to stage 1 switches 220. Stage 1 switches 220 may divide a L1 train packet into sub train packets and transmit the sub train packets to switch planes 230. Switch planes 230 may transmit sub train packets to stage 3 switches 240 by using S2RT of headers of L0 train packets.

Stage 3 switches 240 may duplicate L0 train packets to corresponding egress interposers 250 by using S3RT of headers of L0 train packets. Egress interposers 250 may divide L0 train packet into two cells. A grouped multicast cell may be duplicated in a corresponding port by performing a multicast table lookup operation through a connection ID transmitted from a switch terminal through a cell header. A unicast cell may be transmitted to a corresponding port by employing S4RT of a header of L0 train packet. A grouped multicast cell may maintain different routing tags in each switch. A unicast cell may store a routing tag to egress interposers in a header of a L0 train packet. In a case that a grouped multicast cell and a unicast cell compose a L1 train packet, a unicast cell may convert a S2RT to be identical to a S2RT of the grouped multicast cell in order to reach an identical stage 3 switch with the grouped multicast cell. A unicast cell may convert S3RT to be identical to S3RT of a grouped multicast cell to reach egress interposers with the grouped multicast cell. Accordingly, duplicated grouped multicast cells and unicast cells may be transmitted to final destination ports according to a switching operation.

Examples illustrated in FIGS. 9 and 11 relate to embodiments including a method for generating and transmitting a train packet of a general multicast queue. As illustrated in FIG. 9, a service queue may be selected. When a service queue is a general multicast queue, steps S231 and S232 may be performed. As a judgment result of S232, when a general multicast queue is selected as a service queue, parameter (i) notifying a number of L0 train packets may be set up as '0' (S234). It may be confirmed whether a selected queue is empty (S235). When a selected queue is not empty, a new HOL multicast cell may be read from a general multicast queue (S236). It may be confirmed whether a B bit value of a general multicast cell read in S236 is set up as '0' (e.g. whether a succeeding cell has the same S2RT, S3RT, and S4RT) (S238).

As a confirmation result of S238, when a B bit value of a general multicast cell read in S236 is not '0', (e.g. a succeeding cell has different S2RT, S3RT and S4RT, one unicast queue may be selected in a round robin method among a plurality of unicast queues. A plurality of unicast queues may correspond to egress interposers for outputting a general multicast cell by using S2RT and S3RT of general multicast cell read from a general multicast queue selected in S231. One unicast cell may be read from a selected unicast queue (S240 and S242).

Exemplary FIG. 11 illustrates that when a S3RT of a general multicast cell read from a general multicast queue selected in S231 is 00000000 10001000 00000000 00000000 00000000 00000000 00000000 01000011, unicast queues corresponding to egress interposers for outputting the general multicast cell are #0, #1, #6, #51, and #55. One unicast queue may be selected therefrom in a round robin method. One unicast cell may be read from a unicast queue. A L0 train packet may be generated with a general multicast cell read in S236 and a unicast cell read in S242 (S244). A parameter (i) notifying a number of L0 train packets may be increased by one (S246).

Similar to a L0 train packet generated in S244, when a L0 train packet includes a unicast cell, S2RT, S3RT and S4RT must be renewed in a switch routing field stored in a header of the L0 train packet. S2RT and S3RT may be designated identically to S2RT and S3RT of a general multicast cell composing a L0 train packet with a unicast cell. S4RT may be designated by using a cell routing tag stored in a cell header of a unicast cell. It may be judged whether a parameter (i) increased in S246 is identical to a number (K) of switch planes (S248). As a judgment result of S248, when parameter (i) is not identical to the number (K) of switch planes, whether a selected general multicast queue is empty may be confirmed (S250). As a confirmation result of S250, when a general multicast queue selected in S231 is not empty, a routine may go back to S236 to read a new HOL multicast cell from a selected general multicast queue.

As a confirmation result of S250, when a selected general multicast queue is empty in S200, it may be confirmed whether an effective general multicast cell exists in a generated L0 train packet (S252). When an effective general multicast cell does not exist, a L0 train packet including two dummy cells may be generated (S235a). As a confirmation result of S252, when a corresponding queue is empty, the L0 train packet including two dummy cells may be generated (S235a). When a L0 train packet including two dummy cells is generated, a routine may go to S246 to generate a train packet for a succeeding queue. When an effective general multicast cell exists in a L0 train packet, it may be confirmed whether an effective unicast cell is stored in any unicast queues corresponding to an effective general multicast cell included in L0 train packet (S253). As a confirmation result of S253, when an effective unicast cell is not stored, a routine may go to S235a.

As a confirmation result of S253, when an effective unicast cell is stored in any unicast queues corresponding to an effective general multicast cell included in a L0 train packet, the unicast queues may be selected in a round robin method from a plurality of unicast queues corresponding to the final egress interposers 250 for outputting general multicast cells with reference to S2RT and S3RT of the general multicast cells read from a selected general multicast queue (S253). It may be judged whether effective multicast cells are available among selected unicast queues (S254).

As a judgment result of S254, when two effective multicast cells are not available, a L0 train packet may be generated by using one unicast cell and one dummy cell, and a routine may go to S246 (S259). As a judgment result of S254, when two effective multicast cells are available, unicast cells may be read from two selected unicast queues (S257). A L0 train packet may be generated by using two unicast cells (S258). A routine may go to S246 after S258 and S259 to increase parameter (i) for notifying the number of L0 train packets by one.

As depicted in exemplary FIGS. 9(9a,9b), when S3RT of general multicast cells read from a general multicast queue is 00000000 10001000 00000000 00000000 00000000 00000000 00000000 01000011 (S3RT of first cell), 10010000 00000000 00000000 00000000 00000000 00000000 00011100 00000000 (S3RT of second cell), 00101000 00000000 00000000 00000000 00000000 01000011 00000000 00000000 (S3RT of third cell) and 00000000 00000000 01001001 00000000 11100011 00000000 00000000 00000000 (S3RT of fourth cell), if a L0 train packet composed merely of unicast cells is set up to follow the last cell (fourth cell), unicast queues corresponding to egress interposers for outputting fourth general multicast cell may be #24, #25, #29, #30, #31, #40, #43 and #46. Two unicast queues may be selected therefrom in a round robin method. One unicast cell may be read respectively from two unicast queues. A L0 train packet may be generated with two unicast cells read in S256 (S258). A routine may go back to S246 to increase parameter (i) notifying a number of L0 train packets by one.

As a confirmation result of S238, when B bit value of a general multicast cell read in S231 is set up as '0', (e.g. a succeeding cell has the same S2RT and S3RT), one general multicast cell may then be read from a selected general multicast queue (S260). A L0 train packet may be generated by using a general multicast cell read in S236. A general multicast cell may be read in S260 (S262). A routine may go back to S246 to increase parameter (i) notifying a number of L0 train packets by one. A general multicast traffic includes K effective L0 train packets in ingress interposers through an exemplary procedure of S232 to S262. K L0 train packets may compose a L1 train packet. A L1 train packet generated in ingress interposers 210 may be inputted to stage 1 switches 220, as illustrated in FIG. 11.

As illustrated in FIG. 11, stage 1 switches 220 may divide L1 train packet into sub train packets. Stage 1 switches 220 may transmit them to switch planes 230. The switch planes 230 may duplicate sub train packets to stage 3 switches 240 by using S2RT of a header of a L0 train packet. Stage 3 switches 240 may duplicate L0 train packets to corresponding egress interposers 250 by using a S3RT of a header of a L0 train packet. Egress interposers 250 may divide a L0 train packet into two cells. A general multicast cell may be duplicated in a corresponding port by performing a multicast table lookup operation through a connection ID transmitted from a switch terminal through a cell header. A unicast cell may be transmitted to a corresponding port by employing S4RT of a header of a L0 train packet. Accordingly, duplicated general multicast cells and unicast cells may be transmitted to final destination ports (e.g. line cards) according to a switching operation.

In order to generate a L1 train packet when a multicast queue (grouped multicast queue or general multicast queue) is determined to be served in a cell time slot, a cell may be read from a selected multicast queue. In embodiments of the present invention, when a destination switch port information of all read multicast cells (below K) is logically ORed, a cell may be read from a unicast queue corresponding to newly-corrected multicast routing switch port, thereby generating a L1 train packet.

For example, when a number of multicast queues is smaller than a number of the switch planes and a destination switch port information is logically ORed, destination switch port information notifying that two multicast cells read from a queue are cells to be outputted to #1 and #2 switch ports and #5, #6 and #8 switch ports is Ored. Multicast cell routing tags may be then corrected to convert #1, #2, #5, #6 and #8 switch ports into destination switch ports. In accordance with embodiments of the present invention, effective L0 train packets may be generated by using cells read from #1, #2, #5, #6 and #8 unicast queues.

An object of embodiments of the present invention is to provide a method for generating and transmitting a train packet in an ATM switch system which can generate the train packet without using dummy cells by reading an effective cell from a unicast queue in want of dummy cells, when the train packet is generated for a multicast traffic.

Embodiments of the present invention relate to a method for generating a train packet in an ATM switch system including: a first scheduling step for selecting a service queue for various traffic type classified according to a number of destination ports of inputted cells and properties thereof as a service queue; and a second scheduling step for reading a unicast cell required to generate the train packet from a unicast queue corresponding to the multicast queue when the first scheduling step selects multicast queue to serve, and generating the train packet including effective cells, when the effective train packet is not generated with multicast cells of the selected multicast queue.

In embodiments, the first scheduling step selects the service queue to serve in a current cell time slot among the unicast queues, general multicast queues, grouped multicast queues and broadcast queues classified according to the number of the destination ports of the inputted cells and the properties thereof. In embodiments, the second scheduling step reads the unicast cells required to generate the train packet from the unicast queue identifying the $3^{rd}$ stage switches to which the multicast cell stored in the selected multicast queue.

In embodiments, the second scheduling step comprises the first step for reading the necessary unicast cell from the unicast queue identifying the $3^{rd}$ stage switches to which the multicast cell stored in the selected multicast queue, and sequentially generating an L0 train packet having two effective cells; and a second step for reading the unicast cell from the unicast queue corresponding to the multicast queue, and sequentially generating effective L0 train packets as many as switch planes, when the L0 train packets are not generated as many as the switch planes by using the multicast queue.

In embodiments, the second scheduling step reads the unicast cell from the unicast queue identifying the selected grouped multicast queue which implies the 3rd stage switches to which the multicast cell in the grouped multicast queue in destined, identifying unicast queues pertained to the 3rd stage switches and generates the L0 train packet including the unicast cell and the grouped multicast cell, when the grouped multicast queue is selected as the service queue by first scheduling.

In embodiments, the switch routing tags stored in headers of the L0 train packets comprise a second switch routing tag for transmission to the switch planes, a third switch routing tag for transmission to merging units, and a fourth switch routing tag for transmission to egress interposers in order to transmit the unicast cell conveyed with the grouped multicast cell.

In embodiments, the second scheduling step reads the unicast cell from the unicast queue corresponding to one of the egress interposers to which the cell read from the general multicast queue is destined, and generates the L0 train packet having the unicast cell and the general multicast cell, when the general multicast queue is selected as the service queue.

In another aspect of embodiments of the present invention, there is provided a method for transmitting a train packet in an ATM switch system, comprising: selecting a multicast traffic classified according to a number of destination ports of inputted cells and properties thereof as a service queue; selectively reading a multicast cell of the selected multicast queue and a unicast cell of a unicast queue corresponding to the multicast queue, and generating the train packet; slicing the train packet into sub train packets as many as switch planes by a first switch, and transmitting the sub train packets; transmitting the sub train packets to a third switch by the switch planes according to a routing tag of a header of the train packet; duplicating an L0 train packet by the third switch according to the third switch routing tag included in the header of the train packet, and transmitting the duplicated packets to corresponding egress interposers; and dividing the L0 train packet into two cells through the egress interposers, duplicating the multicast cells through a connection ID, and transmitting the duplicated cells to a corresponding port.

In accordance with embodiments of the present invention, when train packets are generated for processing multicast traffic, effective cells may be read from a selected unicast queue through a secondary scheduler instead of dummy cells. As a result, the train packets can be generated by using the effective cells instead of using the dummy cells, to improve a switch processing ratio.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art.

What is claimed is:

1. A method for generating a train packet in an ATM switch system, comprising:
    a first scheduling step for selecting a service queue for various traffic type classified according to a number of destination ports of inputted cells and properties thereof as a service queue; and
    a second scheduling step for reading a unicast cell required to generate the train packet from a unicast queue corresponding to the multicast queue when the first scheduling step selects multicast queue to serve, and generating the train packet including effective cells, when the train packet is not generated with a multicast cell of the selected multicast queue, wherein the second scheduling step further comprises:
    the first step for reading the necessary unicast cell from the unicast queue identifying the $3^{rd}$ stage switches to which the multicast cell stored in the selected multicast queue, and sequentially generating an L0 train packet having two effective cells; and
    a second step for reading the unicast cell from the unicast queue corresponding to the multicast queue, and sequentially generating effective L0 train packets as many as switch planes, when the L0 train packets are not generated as many as the switch planes by using the multicast queue.

2. The method of claim 1, wherein the first scheduling step selects the service queue to serve in a current cell time slot among the unicast queues, general multicast queues, grouped multicast queues and broadcast queues classified according to the number of the destination ports of the inputted cells and the properties thereof.

3. The method of claim 1, wherein the second scheduling step reads the unicast cells required to generate the train packet from the unicast queue identifying the $3^{rd}$ stage switches to which the multicast cell stored in the selected multicast queue is destined.

4. The method of claim 1, whether the unicast cells is required to generate the L0 train packet, is determined according to whether the L0 train packets for generating an L1 train packet are generated by using the multicast cells stored in the selected multicast queue.

5. The method of claim 1, wherein the first step is performed when at least one cell is inputted as an effective cell.

6. The method of claim 1, wherein the first step is performed when a routing tag of one of the two adjacent cells of the multicast queue is different from a cell routing tag of the multicast queue.

7. The method of claim 1, wherein the second step comprises the steps of:
    selecting one of routing tags of the cells read from the selected multicast queue, when the multicast queue is empty;
    selecting two unicast queues in a round robin method among the plurality of unicast queues corresponding to the egress interposers for outputting the cells according to the routing tag of the selected multicast queue; and
    reading one unicast cell respectively from the two selected unicast queues, and generating the L0 train packets by using the two unicast cells, respectively.

8. The method of claim 1, wherein the unicast cells required to generate the L0 train packets are read from the unicast queue with reference to the number of the egress interposer of the multicast cell.

9. A method for generating a train packet in an ATM switch system, comprising:
    a first scheduling step for selecting a service queue for various traffic type classified according to a number of destination ports of inputted cells and properties thereof as a service queue; and
    a second scheduling step for reading a unicast cell required to generate the train packet from a unicast queue corresponding to the multicast queue when the first scheduling step selects multicast queue to serve, and generating the train packet including effective cells, when the train packet is not generated with a multicast cell of the selected multicast queue,
    wherein the second scheduling step reads the unicast cell from the unicast queue identifying the selected grouped multicast queue which implies the $3^{rd}$ stage switches to which the multicast cell in the grouped multicast queue is destined, identifying multicast queues pertained to the $3^{rd}$ stage switches and generates the L0 train packet including the unicast cell and the grouped multicast cell, when the grouped multicast queue is selected as the service queue by first scheduling.

10. The method of claim 6, wherein one unicast cell is selected from one unicast queue among a predetermined number of unicast queues corresponding to the number of the grouped multicast queue.

11. The method of claim 8, wherein, when a number of the effective grouped multicast cells for generating the L0 train packets is smaller than a number of the switch planes in the selected grouped multicast queue, one unicast cell is read respectively from the plurality of unicast queues corresponding to the selected grouped multicast queue, and the effective L0 train packets are generated as many as the switch planes.

12. A method for generating a train packet in an ATM switch system, comprising
    a first scheduling step for selecting a service queue for various traffic type classified according to a number of destination ports of inputted cells and properties thereof as a service queue; and
    a second scheduling step for reading a unicast cell required to generate the train packet from a unicast queue corresponding to the multicast queue when the first scheduling step selects multicast queue to serve, and generating the train packet including effective cells, when the train packet is not generated with a multicast cell of the selected multicast queue, wherein the second scheduling step reads the unicast cell from the unicast queue corresponding to one of the egress interposers to which the cell read from the general multicast queue is destined, and generates the L0 train packet having the unicast cell and the general multicast cell, when the general multicast queue is selected as the service queue.

13. The method of claim 12, wherein one unicast queue is selected from a predetermined number of unicast queues corresponding to a number of the general multicast queue.

14. The method of claim 12, wherein, when a number of effective general multicast cells for generating the L0 train packets is smaller than a number of the switch planes in the general multicast queue, unicast cells are read respectively from the plurality of unicast queues corresponding to an egress routing tag of the selected general multicast cell, and effective L0 train packets corresponding to the number of the switch planes are generated.

15. The method of claim 12, wherein the switch routing tags stored in headers of the L0 train packets comprise a second switch routing tag for transmission to the switch planes, a third switch routing tag for transmission to merging units, and a fourth switch routing tag for transmission to egress interposers in order to transmit the unicast cell with the general multicast cell.

16. The method of claim 1, wherein the unicast queue is selected in a round robin method among the predetermined number of unicast queues corresponding to the number of the multicast queue.

17. A method for generating a train packet in an ATM switch system, comprising:
a) selecting a grouped multicast traffic classified according to a number of destination ports of inputted cells and properties thereof as a service queue;
b) reading a unicast cell from a unicast queue corresponding to a number of the selected grouped multicast queue, and sequentially generating an L0 train packet having the unicast cell and the grouped multicast cell, when the train packet is not generated with the grouped multicast cells; and
c) reading the unicast cell from the unicast queue corresponding to the selected multicast queue, and generating the L0 train packets as many as switch planes, when the number of the effective grouped multicast cells for generating the L0 train packets is smaller than the number of the switch planes in the selected grouped multicast queue.

18. A method for generating a train packet in an ATM switch system, comprising:
selecting a general multicast traffic classified according to a number of destination ports of inputted cells and properties thereof as a service queue; and
reading a unicast cell from a unicast queue corresponding to a number of the selected general multicast queue, and sequentially generating an L0 train packet having the unicast cell and the general multicast cell, when the train packet is not generated with the general multicast cells; and
reading the unicast cells from the unicast queues corresponding to the selected multicast queues, and generating the L0 train packets as many as switch planes, when the number of the effective general multicast cells for generating the L0 train packets is smaller than the number of the switch planes in the selected general multicast queue.

19. A method for generating a train packet, comprising:
selecting a service queue for storing traffic based on a number of destination ports of input cells and properties of the cells; and
reading a unicast cell from a unicast queue corresponding to a multicast queue when the multicast queue is selected as the service queue and generating a train packet including effective cells, when the train packet is not generated with a multicast cell of the selected multicast queue, wherein reading the unicast cell includes:
reading the unicast cell from the unicast queue identifying the selected grouped multicast queue which implies switches to which the multicast cell in the grouped multicast queue is destined, and
identifying multicast queues pertained to switches, the L0 train packet being generated to include the unicast cell and the grouped multicast cell, when the grouped multicast queue is selected as the service queue by first scheduling.

20. The method of claim 19, wherein the service queue is selected to serve in a current cell time slot among unicast queues, general multicast queues, grouped multicast queues and broadcast queues classified according to the number of the destination ports of the input cells and cell properties.

21. The method of claim 19, wherein reading the unicast cell including reading at least one unicast cell required to generate the train packet from the unicast queue identifying switches to which the multicast cell stored in the selected multicast queue is destined.

22. A method for generating a train packet, comprising:
selecting a service queue for storing traffic based on a number of destination ports of input cells and properties of the cells; and
reading a unicast cell from a unicast queue corresponding to a multicast queue when the multicast queue is selected as the service queue and generating a train packet including effective cells, when the train packet is not generated with a multicast cell of the selected multicast queue, wherein reading the unicast cell comprises:
reading the unicast cell from the unicast queue identifying switches to which the multicast cell is stored in the selected multicast queue, and sequentially generating an L0 train packet having two effective cells; and
reading the unicast cell from the unicast queue corresponding to the multicast queue, and sequentially generating effective L0 train packets as many as switch planes, when the L0 train packets are not generated as many as the switch planes by using the multicast queue.

23. The method of claim 22, wherein whether the unicast cells is required to generate the L0 train packet, is determined according to whether the L0 train packets for generating an L1 train packet are generated by using the multicast cells stored in the selected multicast queue.

24. The method of claim 22, wherein selecting a service queue is performed when at least one cell is inputted as an effective cell.

25. The method of claim 22, wherein selecting a service queue is performed when a routing tag of one of the two adjacent cells of the multicast queue is different from a cell routing tag of the multicast queue.

26. The method of claim 22, wherein reading the unicast cell comprises:

selecting one of routing tags of the cells read from the selected multicast queue, when the multicast queue is empty;

selecting two unicast queues in a round robin method among a plurality of unicast queues corresponding to the egress interposers for outputting the cells according to the routing tag of the selected multicast queue; and reading one unicast cell respectively from the two selected unicast queues, the L0 train packets being generated by using the two unicast cells, respectively.

27. The method of claim 19, wherein the unicast cells required to generate the L0 train packets are read from the unicast queue with reference to the number of the egress interposer of the multicast cell.

28. The method of claim 25, wherein one unicast cell is selected from one unicast queue among a predetermined number of unicast queues corresponding to a number of the grouped multicast queue.

29. A method for generating a train packet, comprising:

selecting a service queue for storing traffic based on a number of destination ports of input cells and properties of the cells; and reading a unicast cell from a unicast queue corresponding to a multicast queue when the multicast queue is selected as the service queue and generating a train packet including effective cells, when the train packet is not generated with a multicast cell of the selected multicast queue, wherein the unicast cells required to generate the L0 train packets are read from the unicast queue with reference to the number of the egress interposer of the multicast cell, and wherein, when a number of the effective grouped multicast cells for generating the L0 train packets is smaller than a number of the switch planes in the selected grouped multicast queue, one unicast cell is read respectively from the plurality of unicast queues corresponding to the selected grouped multicast queue, and the effective L0 train packets are generated as many as the switch planes.

30. A method for generating a train packet, comprising:

selecting a service queue for storing traffic based on a number of destination ports of input cells and properties of the cells; and reading a unicast cell from a unicast queue corresponding to a multicast queue when the multicast queue is selected as the service queue and generating a train packet including effective cells, when the train packet is not generated with a multicast cell of the selected multicast queue, wherein the reading the unicast cell includes reading the unicast cell from a unicast queue corresponding to one of the egress interposers to which the cell read from the general multicast queue is destined, and wherein generating the train packer includes generating an L0 train packet having the unicast cell and the general multicast cell, when the general multicast queue is selected as the service queue.

31. The method of claim 30, wherein one unicast queue is selected from a predetermined number of unicast queues corresponding to a number of the general multicast queue.

32. The method of claim 30, wherein, when a number of effective general multicast cells for generating the L0 train packets is smaller than a number of the switch planes in the general multicast queue, unicast cells are read respectively from the plurality of unicast queues corresponding to an egress routing tag of the selected general multicast cell, and effective L0 train packets corresponding to the number of the switch planes are generated.

33. The method of claim 30, wherein the switch routing tags stored in headers of the L0 train packets comprise a second switch routing tag for transmission to the switch planes, a third switch routing tag for transmission to merging units, and a fourth switch routing tag for transmission to egress interposers in order to transmit the unicast cell with the general multicast cell.

34. The method of claim 19, wherein the unicast queue is selected in a round robin method among the predetermined number of unicast queues corresponding to the number of the multicast queue.

* * * * *